Oct. 3, 1939.　　　　C. C. JACOBS　　　　2,174,698
VARIABLE TRANSMISSION
Filed Aug. 17, 1938　　　3 Sheets-Sheet 2
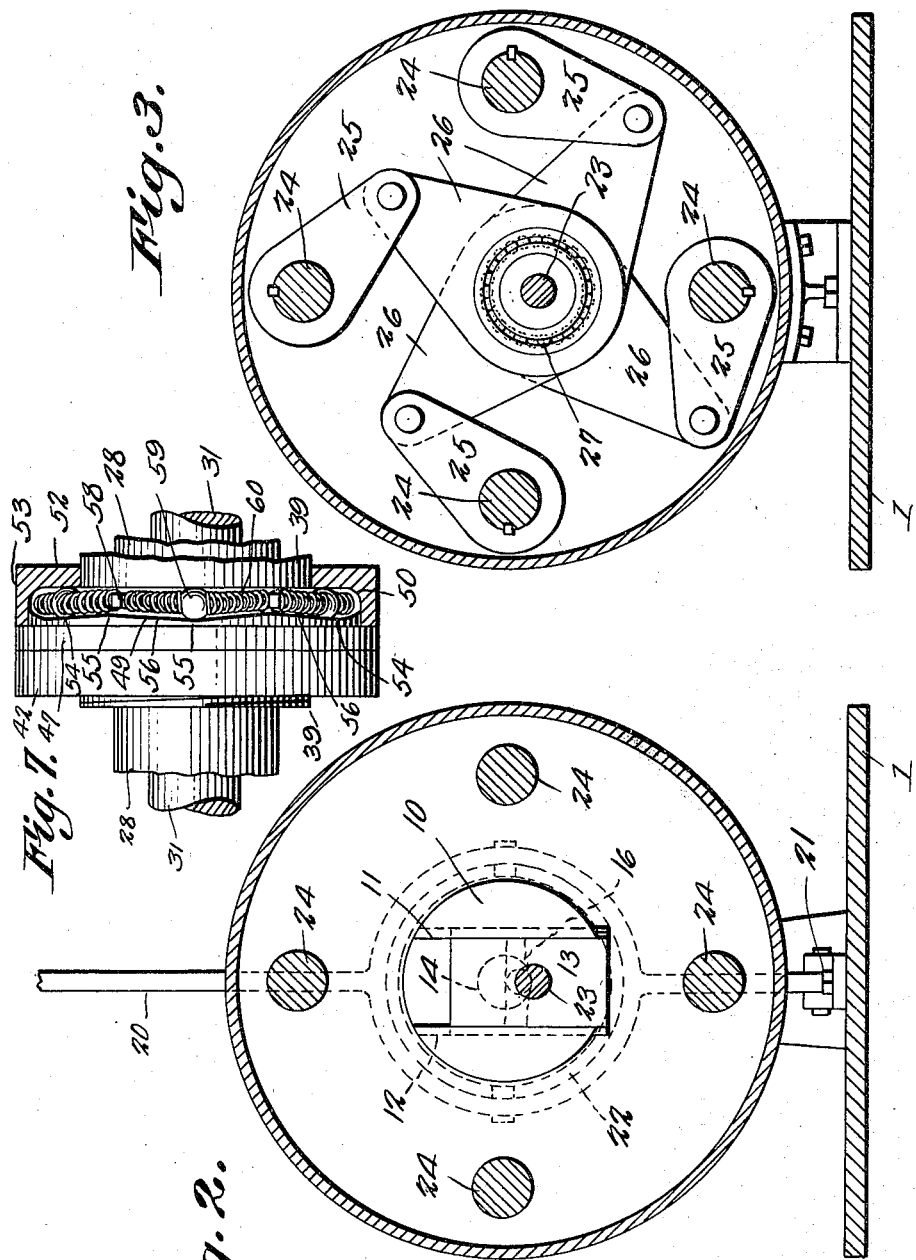
C. C. Jacobs
INVENTOR.
BY CASnow&Co
ATTORNEYS.

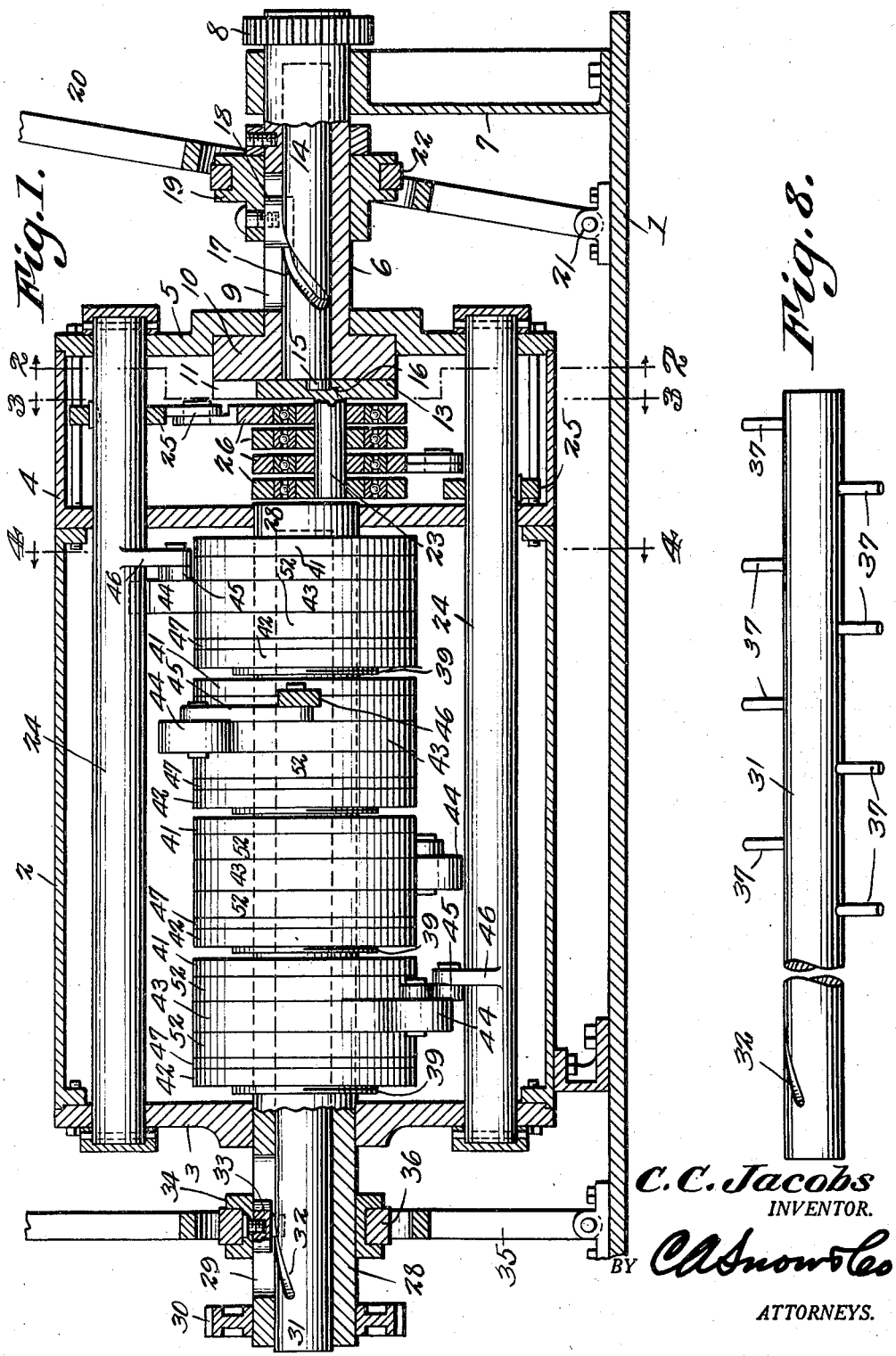

Oct. 3, 1939.    C. C. JACOBS    2,174,698
VARIABLE TRANSMISSION
Filed Aug. 17, 1938    3 Sheets-Sheet 3
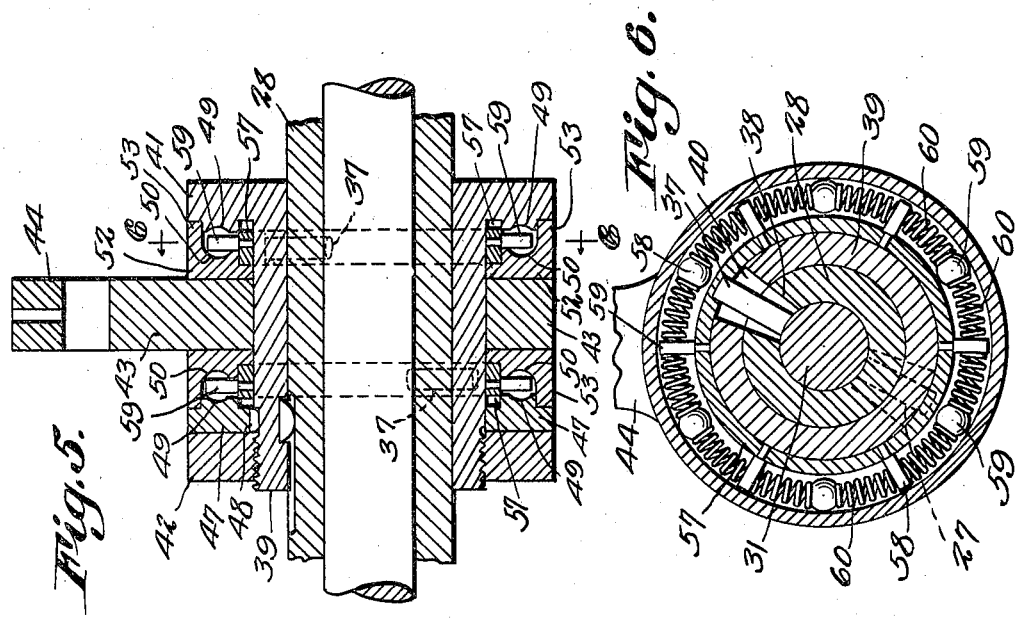
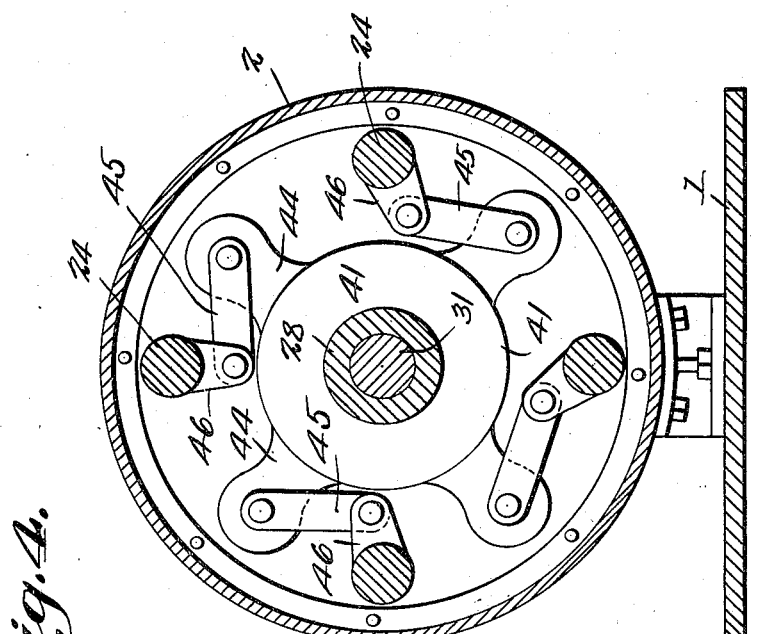
C. C. Jacobs
INVENTOR.
BY CAKnowles.
ATTORNEYS.

Patented Oct. 3, 1939

2,174,698

UNITED STATES PATENT OFFICE 2,174,698

VARIABLE TRANSMISSION

Charles C. Jacobs, Akron, Ohio

Application August 17, 1938, Serial No. 225,480

4 Claims. (Cl. 74—117)

This invention relates to a variable transmission, one of the objects being to provide a mechanism of this character containing no gears and which can be used for transmitting circular motion at any desired speed between neutral and the maximum speed limit of the driving motor, whether the transmission is in "forward" or "reverse".

A still further object is to provide simple and efficient means for shifting the transmission into either "forward or "reverse".

A still further object is to provide a transmission which is compact in construction and all parts of which can operate in oil so as to reduce wear to the minimum.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention, as claimed.

In the accompanying drawings the preferred form of the invention has been shown.

In said drawings

Figure 1 is a vertical longitudinal section through the variable transmission constituting the present invention, parts of the interior mechanism being shown in section and parts in elevation.

Figure 2 is a section on line 2—2 Figure 1.

Figure 3 is a section on line 3—3 Figure 1.

Figure 4 is a section on line 4—4 Figure 1.

Figure 5 is a transverse section through one of the driving clutches.

Figure 6 is a section on line 6—6 Figure 5.

Figure 7 is a view partly in elevation and partly in section of a portion of a driving clutch.

Figure 8 is an elevation of the clutch reversing handle.

Referring to the drawings by characters of reference, I designates a suitable supporting structure to which is fixedly connected a casing 2 of any preferred construction but preferably cylindrical. This casing is closed at one end by a head 3 while its other end is closed by a supplemental casing 4 having a removable head 5 at its outer end. All of the parts of the casing are detachably connected so that access may be had readily to the mechanism housed therein.

A tubular drive shaft 6 is journalled in the head 5 and also in a fixed bearing element 7 and this shaft is adapted to receive a motion from a motor to any suitable mechanism which can, if desired, include a gear 8.

The shaft is provided with a longitudinal slot 9 and that end of the shaft within the supplemental casing 4, is formed with a disk-like head 10 formed, in its inner face, with a diametrical groove 11, the walls of which can be undercut as indicated at 12 so that this groove thus constitutes a guide for a slide 13.

A spindle 14 is mounted for rotation within the shaft 6 and head 10, one end of this shaft being located back of and in contact with the slide 13 as shown particularly in Figure 1. An eccentrically located stud 15 projects from said end of the spindle into a transverse groove 16 in the back space of slide 13 and formed in the spindle at an intermediate point, is a spiral groove 17 which extends across the slot 9 and has mounted in it a shifting block 18 which is slidable longitudinally of slot 9 and is pivoted to and movable with a collar 19 slidable on shaft 6. This block 18 serves as a key for holding together the collar 19, shaft 6 and spindle 14 for simultaneous rotation. It also serves to rotate spindle 14 in one direction or the other within shaft 6 when said block is shifted longitudinally of slot 9. This shifting is effected by means of a lever 20 fulcrumed at 21 and pivotally joined to a ring 22 extending into the periphery of the collar and in which said collar is mounted for rotation.

A wrist pin 23 is extended from the slide 13 at a point on the longitudinal center of the slide and it will be apparent that, when spindle 14 is rotated in one direction relative to shaft 6 in which it is located, the stud 15 will shift slide 13 so as to move the wrist pin 23 into position where it is coaxial with spindle 14 and shaft 6. When the spindle 14 is rotated in the opposite direction, the stud 15 will shift the slide 13 in groove 11 so as to move the wrist pin 23 out of coaxial position, the extent of this movement being dependent upon the extent of the independent rotation of spindle 14. Obviously this rotation of the spindle can be effected at any time during the rotation of shaft 6 and the spindle therein, simply by swinging lever 20 in one direction or the other a distance necessary to effect the desired results.

A series of rock shafts 24 are journalled at their ends in the heads 3 and 5 and extend through the two casings, these rock shafts being parallel and spaced apart regularly. In the structure illustrated four rock shafts have been shown but it is to be understood that this number can be increased or reduced as preferred. Each rock shaft is provided, in the supplemental casing 4, with a crank arm 25 and, as shown particularly in Figure 3, these crank arms all extend in the same general direction from the respective rock arms although, as indicated in Figure 1, the crank arms work in different planes. Each crank arm is connected by a link 26 to the wrist pin 25 and it is preferred to provide anti-friction bearings 27 between these links and the wrist pin to reduce friction to the minimum.

Obviously by providing the connections described, the rock shaft 24 will be operated successively by the wrist pin when mounted off center so that, during the completion of the movement of each rock in one direction, another rock shaft is commencing to rotate in the same direction. However, when the wrist pin 23 is brought into position where it is coaxial with spindle 14, there will be no transmission of motion to the rock shaft.

Located within the casing 2 between head 3 and supplemental casing 4 are driving clutches equal in number to the rock shaft. These driving clutches are carried by a tubular driven shaft 28 which, as shown in Figure 1, is journalled in head 3 and the inner end of supplemental casing 4, there being a longitudinal slot 29 in that portion of the shaft located outside of the casing. This shaft can be used for driving any suitable mechanism and power may be taken therefrom through a gear 30 or the like secured to the shaft.

The "reverse" spindle is mounted within and extends longitudinally of the tubular shaft 28, as indicated at 31 and this spindle is provided with a spiral groove 32 which extends across slot 29 so as to be engaged by a shifting slide 33 which is adapted to move back and forth in slot 29 and project into groove 32. This slide is carried by a collar 34 which extends around shaft 28 and the collar is shiftable by a lever 35 pivotally connected to a ring 36 which is seated in the periphery of the collar and in which said collar is adapted to rotate while shaft 28 is rotating. Obviously when lever 35 is shifted in one direction, spindle 31 will be rotated in one direction independently of the shaft 28 whereas when the lever is shifted in the opposite direction the rotation of said spindle within shaft 28 will be reversed.

Extending from the spindle are pairs of pins 37, one pair being provided for each driving clutch and the pins of each pair being out of alinement and extended in opposite directions respectively. These pins project through slots within shaft 28, these slots being of such length as to permit limited oscillation of the pins as well as limited rotation of the spindle within shaft 28.

Each driving clutch includes a sleeve 39 keyed to the shaft so as to rotate therewith, said sleeve being formed with short slots 40, registering with the slots 38 so that the pins 37 can work therein. An annular flange 41 is located at one end of the sleeve while the other end of the sleeve is detachably engaged by a ring 42 screwed thereon and constituting adjusting and retaining means. A driving ring 43 is mounted on sleeve 39 at a point between flange 41 and nut 42 and this ring has an arm 44 extending outwardly therefrom and connected by a link 45 to a crank arm 46 extending from one of the rock shafts 24. By referring to Figure 4 it will be noted that all of the links 45 are extended in the same general direction and that all of the crank arms 46 are extended inwardly toward the drive clutches. The crank arms 46 work in different planes so that they can be connected by their links 45 to the arms 44 of the respective drive clutches.

Mounted on sleeve 39 at the inner side of the retaining nut 42, is a ring 47 which is keyed to the sleeve so as to rotate therewith and with shaft 28. The key has been indicated at 48. The inner side of this ring 47 as well as the inner side of the flange 41, is formed with a ball race 49 and each of these races is directly opposite another ball race 50 formed in one of a pair of oppositely disposed rings 52 located at the opposite sides of the ring 43 and in frictional engagement therewith. It is preferred to form the rings 52 with laterally extended annular flanges 53 for lapping and rotating on the flange 41 and ring 47 respectively so that the space between the races 49 and 50 will be closed.

As has been illustrated particularly in Figure 7, each of the races 49 is of variable transverse depth, forming regularly spaced angular pockets 54 the walls of which diverge laterally to peaks 55 thereby to form obliquely disposed cam faces 56. The opposed races 50 cooperating with the races 49 are not provided with pockets but present a continuous channel free from undulations.

Intermediate rings 57 are rotatable on sleeves 39 at opposite sides of rings 43, these intermediate rings 57 being lapped by portions of the rings 52. The outer ends of pins 37 project into pockets 58 in rings 57 and projecting outwardly from these rings are radial pins 59 which extend between the races and are normally positioned beside the peaks 55.

Balls 59 are mounted for movement within the races, one ball being located in each pocket 54 and each ball is held normally centered at the deepest point in said pocket, by springs 60 which hold the ball between them and are, in turn, held under restraint by the adjacent pins 58. Thus under normal conditions, the balls 59 are located at points equidistant from the peaks 55 with the result that the ring 43 of each clutch member can be turned back and forth on sleeve 39, moving the rings 52 therewith because of their frictional contact with ring 43 and this movement will produce no other result. At this time the shifting pins 37 are located at their central position in the slots 38 and 40 as illustrated in Figure 6.

Let it be assumed that the shifting slide 33 is projecting into the middle portion of groove 32 so that pins 37 are thus held in their intermediate positions within the slots 38 and 40. Let it also be assumed that spindle 14 has been shifted within shaft 6 so that the wrist pin 23 is in a position coaxial with the spindle 14. With the parts thus located motion can be transmitted to shaft 6 without result. As the bearings 27 of links 26 are concentric with the axis of shaft 6, said links will not be shifted.

When it is desired to drive the shaft 28 in one direction, lever 35 is shifted so as to rotate spindle 31 either to the right or to the left depending on the direction in which the shaft is to be driven. This actuation of spindle 31 will cause all of the pins 37 to swing simultaneously in one direction about the axis of the spindle, thereby setting up a rotation of the rings 57 which, in turn, will transmit thrust through pins 59 and those springs 60 in the bars thereof to the balls engaged by said springs. Thus the balls will all be pushed out of the deepest portions of the pockets and against the cam faces 56 in the paths thereof. In other words the balls will be yieldingly wedged between said cam faces and the opposed races 50.

The direction of rotation of shaft 28, having now been arranged, lever 20 is shifted so as to cause the spindle 14 to rotate independently of shaft 6, thus causing the shaft 15 to shift slide 13 and move wrist pin 23 out of coaxial position. As the wrist pin moves away from its initial position, the bearings 27 will act as eccentrics and set up movement of the links 26 which thus will convert the rotary motion of the shaft 6 into oscillating motion of the rock shafts 24. The amount of oscillation will of course depend upon the distance of the wrist pin 23 from the axis of rotation of shaft 6.

As before explained the rock shafts will be actuated in rapid succession, the movement of these rock shafts overlapping. Each of the rock shafts will transmit motion through its arm 46 and link 45 to the clutch arm 44 to which the link is connected. When this clutch arm is moved in one direction its ring 43 will move the friction ring 52 therewith and cause the engaged balls to roll along those cam faces with which they are in contact, thus wedging the balls against the races 49 and causing the ring 47 and flange 41 to rotate with rings 52. Consequently motion will be transmitted through sleeves 39 to shaft 28. Before each ring 43 completes its rotation in one direction, another ring 43 will commence to rotate in the same direction and after each ring has completed its rotation in one direction it will move backwardly or in a reverse direction, at the same time rolling the engaged balls against the action of those springs thrusting thereagainst so that a slip movement will thus be effected without the transmission of any motion to shaft 28. Consequently the clutch members act successively to ratchet the shaft 28 in one direction so that an unbroken uniform rotation of the shaft is set up.

When it is desired to drive the shaft 28 in the opposite direction, it is necessary merely to reverse the movement of lever 35 so as to reverse the rotation of spindle 31, thereby transferring the thrust against the balls 59 from one set of springs to another set so that the balls, instead of being thrust toward one set of cam faces 56, will be thrust against the opposed set of cam faces. Consequently when motion is transmitted from the rock shafts to the rings 43 and the friction rings 52, the ratcheting operation of the clutch members will be reversed and shaft 28 will be driven continuously in the direction opposite to that previously described.

By rotating spindle 31 so as to bring the pins 37 to intermediate positions, the transmission from shaft 6 to shaft 28 can be immediately stopped.

It has been found in practice that by providing a variable transmission such as herein described, it has been possible to operate the driven shaft at any desired speed from neutral or "zero" to the maximum speed of the motor, the rotation of the driven shaft being continuous and unvarying while the apparatus is set at a predetermined speed.

What is claimed is:

1. The combination with a shaft, of separate clutch members, means for moving the clutch members successively about the shaft in one direction, said movements overlapping, and means in the clutch members for simultaneous actuation by an operator to effect a driving connection between the clutch members and the shaft to rotate said shaft continuously in either direction, said means including rings rotatable with the shaft and the clutch member respectively and having opposed races, there being pockets in one of the races separated by cam faces, balls within the opposed races, opposed springs for holding the balls normally seated between the cam faces and within the pockets to permit oscillation of the clutch members independently of the shaft, a ring rotatable about the shaft, means for rotating the intermediate ring in either direction relative to the shaft, and outwardly extending means on the intermediate ring and between the springs for transmitting thrust through the springs at one side thereof against the balls to wedge the balls between the cam faces in the paths thereof and the opposed race thereby to couple the clutch members to the shaft when said members are swung in one direction and to release them from the shaft when they are swung in the opposite direction.

2. The combination with a shaft, of separate clutch members normally mounted for oscillation thereon and independently thereof, means for effecting successive overlapping oscillations of the clutch members in one direction, and means in the clutch members for simultaneous actuation by an operator to effect a driving connection between the clutch members and the shaft to rotate said shaft continuously in either direction, said means including rings rotatable with the shaft and the clutch member respectively and having opposed races, there being pockets in one of the races separated by cam faces, balls within the opposed races, opposed springs for holding the balls normally seated between the cam faces and within the pockets to permit oscillation of the clutch members independently of the shaft, an intermediate ring rotatable about the shaft, means for rotating the intermediate ring in either direction relative to the shaft, and outwardly extending means on the intermediate ring and between the springs for transmitting thrust through the springs at one side thereof against the balls to wedge the balls between the cam faces in the paths thereof and the opposed race thereby to couple the clutch members to the shaft when said members are swung in one direction and to release them from the shaft when they are swung in the opposite direction, said last named means including a spindle rotatably mounted within the shaft, said shaft having slots therein, a driving connection between the spindle and the intermediate ring on the shaft, and cooperating means on the shaft and spindle for imparting to the spindle a rotation in either direction relative to the shaft.

3. The combination with a shaft, of a clutch member mounted for oscillation on the shaft, rings rotatable with the shaft and clutch member respectively and having opposed races, there being pockets in one of the races separated by cam faces, balls within the opposed races, opposed springs for holding the balls normally seated between the cam faces and within the pockets to permit oscillation of the clutch member independently of the shaft, an intermediate ring rotatable about the shaft, means for rotating the intermediate ring in either direction relative to the shaft, and outwardly extended elements on the intermediate ring and between the springs for transmitting thrust through the springs at one side thereof against the balls to wedge the balls between the cam faces in the paths thereof and the opposed race, thereby to couple the clutch member to the shaft when said member is swung in one direction and to release it from the shaft when it is swung in the opposite direction.

4. The combination with a shaft, of a clutch member mounted for oscillation on the shaft, rings rotatable with the shaft and clutch member respectively and having opposed races, there being pockets in one of the races separated by cam faces, balls within the opposed races, opposed springs for holding the balls normally seated between the cam faces and within the pocket to permit oscillation of the clutch member independently of the shaft, an intermediate ring rotatable about the shaft, means for rotating the intermediate ring in either direction relative to the shaft, and outwardly extended elements on the intermediate ring and between the springs for transmitting thrust through the springs at one side thereof against the balls to wedge the balls between the cam faces in the paths thereof and the opposed race, thereby to couple the clutch member to the shaft when said member is swung in one direction and to release it from the shaft when it is swung in the opposite direction, said ring rotating means including a spindle in the shaft having a spiral groove, means guided by the shaft and slidable within the groove to impart rotation to the spindle, and a radial pin extending from the spindle and engaging the intermediate ring, said pin being mounted for oscillation within the shaft, there being a slot in the shaft through which the pin extends.

CHARLES C. JACOBS.